United States Patent
Wang

(10) Patent No.: US 9,325,822 B2
(45) Date of Patent: Apr. 26, 2016

(54) METHOD, DEVICE, AND TERMINAL FOR STORING COMMUNICATION LOG IN SUBSCRIBER IDENTITY MODULE/USER IDENTITY MODEL

(71) Applicant: ZTE CORPORATION, Shenzhen, Guangdong Province (CN)

(72) Inventor: Pengren Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/421,853

(22) PCT Filed: Aug. 12, 2013

(86) PCT No.: PCT/CN2013/081257
§ 371 (c)(1),
(2) Date: Feb. 16, 2015

(87) PCT Pub. No.: WO2013/185729
PCT Pub. Date: Dec. 19, 2013

(65) Prior Publication Data
US 2015/0237184 A1    Aug. 20, 2015

(30) Foreign Application Priority Data
Aug. 16, 2012 (CN) .......................... 2012 1 0292186

(51) Int. Cl.
H04M 1/2745 (2006.01)
H04W 8/18 (2009.01)
H04W 48/18 (2009.01)
H04M 1/725 (2006.01)

(52) U.S. Cl.
CPC ........ H04M 1/274533 (2013.01); H04W 8/183 (2013.01); H04W 48/18 (2013.01); H04M 1/72522 (2013.01)

(58) Field of Classification Search
None
See application file for complete search history.

(56) References Cited

U.S. PATENT DOCUMENTS

| 2005/0101323 | A1* | 5/2005 | De Beer ............... H04M 15/00 455/435.2 |
| 2010/0325269 | A1 | 12/2010 | Kim et al. |
| 2013/0132883 | A1* | 5/2013 | Vayrynen ............. G06F 3/0482 715/773 |

FOREIGN PATENT DOCUMENTS

| CN | 101621827 | * | 1/2010 | ........... H04W 24/08 |
| CN | 101621827 | A | 1/2010 | |
| CN | 102088508 | A | 6/2011 | |
| CN | 102104684 | A | 6/2011 | |
| EP | 2019540 | A2 | 1/2009 | |
| JP | 2003018282 | A | 1/2003 | |
| WO | 2011160361 | A1 | 12/2011 | |

* cited by examiner

Primary Examiner — Leon-Viet Nguyen
(74) Attorney, Agent, or Firm — Ling Wu; Stephen Yang; Ling and Yang Intellectual Property

(57) ABSTRACT

A method, device and terminal for storing a communication log in a subscriber identity module/user identity model. The method includes: after communicating with a phonebook contact person in a subscriber identity module/user identity model, formatting time and duration information of the current communication based on a preset communication log format, and obtaining and storing a byte stream of a current communication log; writing the formatted byte stream of the current communication log into an EF_EXT1 file of the subscriber identity module/user identity model, and categorizing the current communication log according to a preset communication type identifier.

9 Claims, 5 Drawing Sheets

METHOD, DEVICE, AND TERMINAL FOR STORING COMMUNICATION LOG IN SUBSCRIBER IDENTITY MODULE/USER IDENTITY MODEL

TECHNICAL FIELD

The present document relates to the field of communication technologies, and more particularly, to a method, device and terminal for storing a communication log in a subscriber identity module/user identity model.

BACKGROUND

With the continuous development and progress of wireless communication technology, the design of cell phones and other mobile terminals becomes more and more intelligent and humane in the aspect of meeting the needs of users, and the users can use minimal operations to achieve more functions in the mobile phone application process. To this end, the major manufacturers of terminals such as mobile phones are committed to improving the user experience to bring more convenience for the users' lives.

Currently, the communication log function has become an indispensable and important function in the mobile phone. With this function, users can easily view the communication time with a contact person stored in the phone address book, such as when called, texted or emailed with the contact person, and applications of this function can greatly improve the mobile phone's usability and user experience.

The subscriber identity module/user identity model provided by operators to users (Subscriber Identity Module/User Identity Model, SIM/UIM) is used to indicate the identity information of different end-users, and a user establishes contacts with other contact persons via the subscriber identity module/user identity model and its unique number. Wherein, the phonebook contact person log stored in the subscriber identity module/user identity models is called an ADN (Abbreviated Dialing Number) log in the SIM/UIM.

The structure of ADN log supported in the current protocol is as follows:

| | | Field Identifier | | | |
|---|---|---|---|---|---|
| A | B | C | D | E | F |
| Field Use | Name | Total length of C and D fields | TON and NPI | Number | Capacity identifier | Extension log identifier |

Wherein, field A is configured to store name information of a contact person in a phonebook contact person log;

field B is configured to store the length information of the following two fields C and D;

field C is configured to store type of number (TON) and its numbering plan identifier (NPI) of the following D field;

field D is configured to store number information of a contact person in the phonebook log;

field E is a capacity identifier;

field F uses one-byte to indicate the ID of extension log in the EF_EXT1 file (0x6F4A).

Wherein, the structure of the EF_EXT1 file in the protocol is shown in the following table:

| Byte | Description | Length |
|---|---|---|
| 1 | Log type | 1 byte |
| 2 to 12 | Extension data | 11 byte |
| 13 | Extension identifier | 1 byte |

Wherein, the log type is one byte, and the specific description of 8BIT of this one byte in the protocol is as follows:

| B8 | B7 | B6 | B5 | B4 | B3 | B2 | B1 |
|---|---|---|---|---|---|---|---|

B1: representing sub-address of the extension log and used in cooperation with the extension identifier, when this bit is set to 1, indicating that the sub-address exists, and if it is set to 0, indicating that the sub-address does not exist;

B2: indicating the extension log, and if this bit is set to 1, indicating that this log is an extension log, and if it is set to 0, indicating that it is not an extension log;

B3-B8: reserved 6 bits which are set to 0.

Due to the restrictions on the structure of an ADN log stored in the subscriber identity module/user identity model, it results in that a contact in the subscriber identity module/user identity model cannot be subjected to the same communication log storage as a contact in the phone. Because the ADN log which is used to store the phonebook contact log in the SIM/UIM only provides two fields, that is, a name field and a phone number field, which can be used to store the contact information log, therefore, the contact log currently stored in the subscriber identity module/user identity model of the user's mobile phone does not support the common communication log function.

In the existing commercial phones, there are models that store communication logs for a phonebook contact persons in the subscriber identity module/user identity model, but its implementation solution is to store the communication logs of the contact person into the phone's own memory, and the communication log information recorded for a phonebook contact person in the subscriber identity module/user identity model is stored in the phone rather than the subscriber identity module/user identity model, therefore, the previously logged communication logs of the contact person will be lost if the user changes mobile phone frequently, which brings inconvenience to the user and the user experience is poor.

SUMMARY

In order to solve the problem in the related art that communication logs of a contact person cannot be stored in a subscriber identity module/user identity model, the main purpose of the embodiment of the present document is to provide a method, device and terminal for storing a communication log in a subscriber identity module/user identity model.

To achieve the purpose of the embodiment of the present document, the following technical solution is employed to achieve:

a method for storing a communication log in a subscriber identity module/user identity model, comprising:

after communicating with a phonebook contact person in the subscriber identity module/user identity model, formatting time and duration information of a current communication according to a preset communication log format, and obtaining and caching a byte stream of a current communication log;

writing the cached byte stream of the current communication log into an EF_EXT1 file of the subscriber identity module/user identity model, and using a communication type identifier corresponding to the current communication to categorize the current communication log.

Alternatively, after the step of writing the cached byte stream of the current communication log into the EF_EXT1 file of the subscriber identity module/user identity model, the method further comprises: an index is performed for connection through a last byte of each communication log.

Alternatively, after performing all the steps, the method for storing a communication log in the subscriber identity module/user identity model further comprises:

when obtaining a contact person communication log view information sent by a user, applying for a cache space, and one by one reading all categorized communication logs corresponding to the phonebook contact person stored in an EF_EXT1 file of the subscriber identity module/user identity model, and storing them in the cache space, thereafter displaying all the categorized communication logs corresponding to the phonebook contact person in a form of a list.

Alternatively, after performing all the steps, the method for storing a communication log in a subscriber identity module/user identity model further comprises:

when a user updates information of a phonebook contact person in the subscriber identity module/user identity model, searching, based on an ID of an updated field, for communication logs associated with the ID of the field in the EF_EXT1 file of the subscriber identity module/user identity model, and when searched out, modifying contents stored in the last byte of the previous communication log to a ID value of the current communication log in the EF_EXT1 file, if the current communication log is a first communications log stored in the EF_EXT1 file of the subscriber identity module/user identity model, modifying contents of a last byte of the current communication log in an abbreviated dialing number log (ADN) file to the ID value of the current communication log in the EF_EXT1 file.

A device for storing a communication log in a subscriber identity module/user identity model, comprising:

a data preprocessing module, configured to, after communicating with a phonebook contact person in the subscriber identity module/user identity model, format time and duration information of a current communication based on a preset communication log format, obtain and cache a byte stream of the current communication log;

a write-in processing module, configured to write the cached byte stream of the current communication log into an EF_EXT1 file of the subscriber identity module/user identity model, and use a communication type identifier corresponding to the current communication to categorize the current communication log.

Alternatively, the write-in processing module is further configured to, after writing the cached byte stream of the current communication log into the EF_EXT1 file of the subscriber identity module/user identity model, perform an index for connection through a last byte of each communication log.

Alternatively, the device for storing a communication log in a subscriber identity module/user identity model further comprises:

a displaying module, configured to apply for a cache space when obtaining a contact person communication log view information sent by the user, and one by one read all categorized communication logs corresponding to the phonebook contact person stored in the EF_EXT1 file of the subscriber identity module/user identity model, and store them in the cache space, thereafter display all the categorized communication logs corresponding to the phonebook contact person in a form of a list.

Alternatively, the device for storing a communication log in a subscriber identity module/user identity model further comprises:

a synchronization information module, configured to, when a user updates information of a phonebook contact person in a subscriber identity module/user identity model, search, based on an ID of a updated field, for communication logs associated with the ID of the field in the EF_EXT1 file of the subscriber identity module/user identity model, when search out, modify contents stored in a last byte of a previous communication log to the ID value of the current communication log in the EF_EXT1 file, if the current communication log is a first communications log stored in the EF_EXT1 file of the subscriber identity module/user identity model, modify contents of the last byte of the current communication log in an abbreviated dialing number log (ADN) file to the ID value of the current communication log in the EF_EXT1 file.

A terminal, comprising a device for storing a communication log in a subscriber identity module/user identity model, wherein, the device comprises:

a data preprocessing module, configured to, after communicating with a phonebook contact person in the subscriber identity module/user identity model, format time and duration information of the current communication based on a preset communication log format, obtain and cache a byte stream of the current communication log;

a write-in processing module, configured to write the cached byte stream of the current communication log into an EF_EXT1 file of the subscriber identity module/user identity model, and use a communication type identifier corresponding to the current communication to categorize the current communication log.

Alternatively, the write-in processing module is further configured to, after writing the cached byte stream of the current communication log into the EF_EXT1 file of the subscriber identity module/user identity model, perform an index for connection through the last byte of each communication log.

Alternatively, the device for storing a communication log in a subscriber identity module/user identity model further comprises:

a displaying module, configured to apply for a cache space when obtaining a contact person communication log view information sent by a user, and one by one read all categorized communication logs corresponding to the phonebook contact person stored in the EF_EXT1 file of the subscriber identity module/user identity model, and store them in the cache space, thereafter display all the categorized communication logs corresponding to the phonebook contact person in a form of a list.

Alternatively, the device for storing a communication log in a subscriber identity module/user identity model further comprises:

a synchronization information module, configured to, when a user updates information of a phonebook contact person in a subscriber identity module/user identity model, based on an ID of a updated field, search for communication logs associated with the ID of the updated field in the EF_EXT1 file of the subscriber identity module/user identity model, when searched out, modify contents stored in the last byte of the previous communication log to the ID value of the current communication log in the EF_EXT1 file, if the current communication log is the first communications log stored in the EF_EXT1 file of the subscriber identity module/user identity model, modify contents of the last byte of the current communication log in an abbreviated dialing number log (ADN) file to the ID value of the current communication log in the EF_EXT1 file.

It can be seen from the technical scheme of the embodiment of the present document that, compared to the related art, after the communication logs of a contact person is stored in the subscriber identity module/user identity model by using the embodiment of the present document, the communication logs stored in the subscriber identity module/user identity model can be universally used in different mobile phone terminals, thereby increasing the versatility of the communication log function and greatly improving the user experience.

In addition, the embodiment of the present document can be used to improve the robustness of communication log data storage, regardless whether the user replaces a phone terminal, restores the factory settings or clears user data or not, as long as the user does not replace the subscriber identity module/user identity model, communication logs, such as when called, texted or emailed, with a certain contact can always be viewed.

Figure 1:
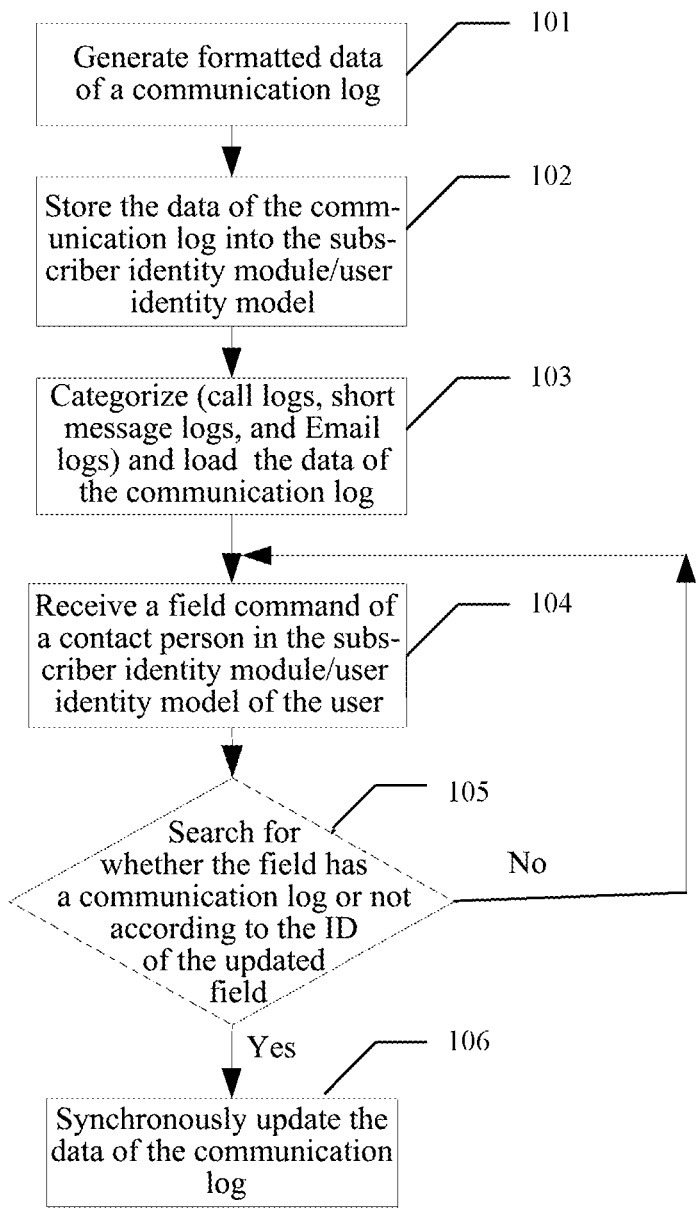
FIG. 1 is a schematic diagram of the process of storing a communication log of a contact person in a subscriber identity module/user identity model provided in an embodiment of the present document.

The implementation, features and excellent effects of the purpose of the embodiment of the present document will be further described with combination of specific embodiments and the accompanying drawings in the following.

PREFERRED EMBODIMENTS OF THE DOCUMENT

Hereinafter, the technical solution of the present document will be further described in conjunction with the accompanying drawings and specific embodiments, to enable those skilled in the art better understand and implement embodiments of the present document, but the illustrated embodiments are not intended to limit the embodiments of the present document.

The embodiment of the present document provides a method for storing a communication log in a subscriber identity module/user identity model, which mainly comprises the following specific steps:

S10, after communicating with a phonebook contact person in the subscriber identity module/user identity model, time and duration information of this communication is formatted based on a preset communication log format, and a byte stream of the current communication log is obtained and stored;

S20, the formatted byte stream of the current communication log is written into the EF_EXT1 file of the subscriber identity module/user identity model, and the current communication log is categorized in accordance with the preset communication type identifier.

In step S20, after the formatted byte stream of the current communication log is written into the EF_EXT1 file of the subscriber identity module/user identity model, an index is made for connection index through the last byte of each communication log.

After performing all the steps S10-S20, the method for storing a communication log in a subscriber identity module/user identity model may further comprise:

S30, when obtaining a contact person communication log view information sent by a user, a cache space is applied, and all categorized communication logs corresponding to the phonebook contact person stored in the EF_EXT1 file of the subscriber identity module/user identity model are read one by one and stored in the cache space, and thereafter all the categorized communication logs corresponding to the phonebook contact person are displayed in the form of a list.

And, after performing all the steps S10-S20, the method for storing a communication log in a subscriber identity module/user identity model further comprises:

S40, when a user updates information of a phonebook contact person in a subscriber identity module/user identity model, based on the ID of an updated field, communication logs associated with the ID of the field are searched in the EF_EXT1 file of the subscriber identity module/user identity model, and when searched out, contents stored in the last byte of the previous communication log are modified to the ID value of the current communication log in the EF_EXT1 file, if the current communication log is the first communication log stored in the EF_EXT1 file of the subscriber identity module/user identity model, contents in the last byte of the current communication log in the abbreviated dialing number log (ADN) file are modified to the ID value of the current communication log in the EF_EXT1 file.

In a specific implementation, after the user communicates (such as through calls, short messages, or emails) with a contact person in the subscriber identity module/user identity model, the time and duration of the current communication (the duration of short message and email is denoted to 0) are stored in a 9-byte cache, and the storage format is:

Year (one byte), month (one byte), day (one byte), hours (one byte), minutes (one byte), seconds (one byte), duration (two bytes), and field ID (one byte);

thereafter the contents of these 9 bytes are stored in an empty log in the EF_EXT1 file of the subscriber identity module/user identity model, and the third and fourth bits of the first byte of the EF_EXT1 work as a communication type identifier to identify the communication type, for example: if it is a call log, identified as 01; if it is a short message log, identified as 10; if it is an email log, identified as 11.

Moreover, the $13^{th}$ byte of the EF_EXT1 file is used to record the next log of the contact person's communication logs in the EF_EXT1 file, if this communication log is the first communication log of the contact person, then the last byte of the ADN log is used to record the ID value of this log in the EF_EXT1 file, thus making the indexes of communication logs of this contact in series. When the user edits subsequently the logs of the contact person in the subscriber identity module/user identity model, only communication logs of the contact person need to be synchronously updated.

The embodiment of the present document provides a method for dynamically storing a communication log of a contact person in a subscriber identity module/user identity model, comprising the following steps:

1, after the user communicates (through calls, short messages, emails) with a contact person in the subscriber identity module/user identity model, the time and duration of the current communication (the duration of the short message and email is denoted as 0) and the ID of the field for which the communication log is generated are stored in a 9-bytes cache, and the format is shown in the following table:

| Year | Month | Day | Hours | Minutes | Seconds | Duration | Field ID |
|---|---|---|---|---|---|---|---|
| 1 byte | 1 byte | 1 byte | 1 byte | 1 byte | 1 byte | 2 bytes | 1 byte |

For example: the first number of a contact person in the subscriber identity module/user identity model is called at 9:45:21, Jul. 6, 2012, and the call duration is 5 minutes and 25 seconds, then the format to be stored in the communication log is: 0C 07 06 09 2D 15 [05 19] 01.

2, the third and fourth bits of the first byte of the EF_EXT1 works as the communication type identifier to identify the communication type, such as: if it is a call log, identified as 01, if it is a short message log, identified as 10, if it is an email log, identified as 11.

The fifth to eighth bits of the first byte of the EF_EXT1 file are used to record the number of call logs of the contact person, in this embodiment, taking the timeliness of communication logs into account, it is up to 15 communication logs allowed to store for each contact person, if the storage capacity is full, then the subsequent communication logs will overwrite the oldest communication log, and the information of the number of communication logs is only stored in the first communication log of each contact person. If the current communication log is the first communication log of the contact person, then the second bit of the first byte of the EF_EXT1 file is set to 1, and the first bit is set to 0; if it is not the first communication log, then the first bit of the first byte is set to 1, and the second bit is set to 0. Then the communication log data generated in the first step are written into the second to tenth bytes, totally 9 bytes of the EF_EXT1 file. Finally, the $13^{th}$ byte is set to FF.

For example: the first communication log of the contact person in the subscriber identity module/user identity model is a short message, and the contact person has only one communication log, then the first byte of the EF_EXT1 file should be: 00011010, wherein the high four bits are 0001, indicating that the contact person has one communication log, the fourth to fifth bits of the first byte of the EF_EXT1 file are 10, indicating that it is a short message communication log, and the low two bits "10" indicates that it is the first communication log of the contact person.

3, the last byte of the communication log in the EF_AND file is used to index the communication log of the contact person, and therefore, up to 255 communication logs could be supported in the present embodiment. If the last byte of the communication log in the EF_AND file is FF, indicating that the contact person does not have communication logs, then the position which is empty in the EF_EXT1 file is searched out and the communication log is written into the empty position, and the second bit of the first byte of the communication log is set to 1, then the last byte of this communication log is set to FF. If the last byte of the communication log in the EF_AND file is not FF, indicating that there are already communication logs for the contact person, at this time the value of the last byte is read out, and the value is the ID value corresponding to the contact person in the EF_EXT1 file, and then the communication log of the ID in the EF_EXT1 file is read out and the last byte is obtained, if this last byte is FF, an empty log in the EF_EXT1 file is searched out and written with the communication log, and the ID of this log is written into the last byte of the previous communication log. If the byte is not FF, then read the value of the last byte, the value is the ID value of the next communication log in the EF_EXT1 file, until the log whose last byte is FF is searched out in the communication log, then the current communication log is written into the empty log of the EF_EXT1 file, and the last byte of the communication log is written with the ID where the current log is located.

For example: the contact person A in the subscriber identity module/user identity model has two numbers and one Email, and the numbers are respectively: 111111 and 222222; and the number types are respectively: mobile phone and home phone; the Email is: abc@zte.com.cn, there is one call log associated with the number "111111", and there is one short message log associated with the number "222222", and there is one email log associated with the Email "abc@zte.com.cn", then the relationship structure between the ADN log and the EXT1 communication log of the contact person is as follows:

Format of the ADN log:

| | | | AND log | | | |
|---|---|---|---|---|---|---|
| Name | Total length of C and D fields | TON and NPI | Number | Capacity identifier | F | |
| 0x41 | 0x07 | 0xFF | Only the number 1 can be stored here, and other numbers are in the ANR file, and are not cared in the present patent | 1C | Assume that the first empty log position found in the EXT1 file is 10, the communication log of the contact person starts to be stored from 0x0a, then herein the value of the one byte is 0x0a | |

Format of the EXT1 file, in the present embodiment, the EXT1 file is a linear file in the card protocol, that is, one line one log:

| Log ID (line number) | Log Type (1 byte) | Extension data (11 byte) | Extension identifier (1 byte) |
|---|---|---|---|
| ... | | ... Other communication logs | |
| 0x0a | [0011] [01] [01] | 0C 07 06 09 2D 15 [05 19] 01 | 0x0b |
| 0x0b | [0000] [10] [11] | 0C 07 06 0a 05 09 [00 00] 02 | 0x0c |
| 0x0c | [0000] [11] [10] | 0C 07 06 0a 0F 09 [00 00] 03 | 0xFF |
| ... | | Other communication logs ... | | wherein, in the one byte of the log type: 0x0a is the first communication log of the contact person, and the contact person has a total of three communication logs, therefore the high four bits store 0011, indicating 3; the first to second bits are 01, indicating that the current log is not a child log, but there are child logs; the third to fourth bits are 01, indicating that the current communication log type is a call log, and 0x0b and 0x0c logs can be deduced from this.

In the 11 bytes of the extension data: by taking the 0x0a log for example, the first byte of 01 indicates that it is a call log generated for the number 1; the second to third bytes 0519 indicate that the call duration is 5 minutes and 25 seconds; the fourth to sixth bytes 09 2D 15 indicate that the log generation time is 9:45:21; the seventh to eighth bytes 0C 07 indicate July 2012, and 0x0b and 0x0c logs can be deduced from this.

In the one byte of the extension identifier: take the 0x0a log for example, the content 0x0b indicates that the next communication linked to the current communication log is 0x0b, herein 0x0b is the ID of the communication log in the EF_EXT1 file, that is the line number where the log is located, and the 0x0b and 0x0c logs can be deduced from this.

4, when the user views the contact communication log details in the subscriber identity module/user identity model, after communication logs are selected, communication logs of the contact person are read one by one in the EF_EXT1 file, and are divided into three log tabs: call logs, short message logs and email logs, which are displayed in the form of a list.

When the user edits the logs of a contact person in the card, the communication logs of the contact person are synchronously updated. If the user changes or deletes the contact person's number, the ID value of the number is logged, and then the communication log corresponding to the number ID is searched out in the EF_EXT1 file via the ID of the communication log stored in the last byte of the ADN file and then deleted.

Figure 6:
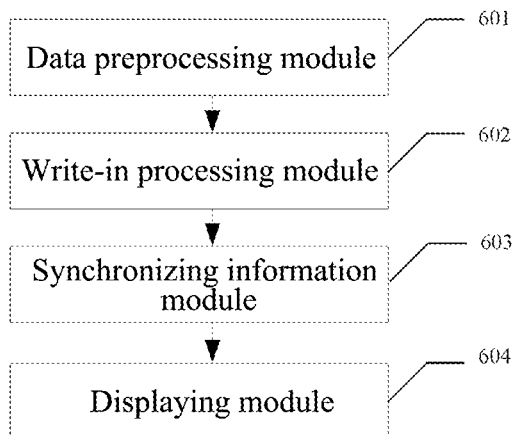
FIG. 6 is a structural diagram of relationships between modules in a device for storing a communication log in a subscriber identity module/user identity model provided in an embodiment of the present document.

As shown in FIG. 6, the embodiment of the present document further provides a device for storing a communication logs in a subscriber identity module/user identity model, comprising:

data preprocessing module 601, configured to, after communicating with a phonebook contact person in the subscriber identity module/user identity model, format time and duration information of the current communication based on a preset communication log format, and obtain and cache a byte stream of the current communication log;

write-in processing module 602, configured to write the formatted byte stream of the current communication log into the EF_EXT1 file of the subscriber identity module/user identity model and categorize the current communication log according to a preset communication type identifier.

The write-in processing module 602 is further configured to write the formatted byte stream of the current communication log into the EF_EXT1 file of the subscriber identity module/user identity model and perform an index for connection through the last byte of each communication log.

The device for storing a communication log in a subscriber identity module/user identity model may further comprise:

displaying module 604, configured to apply for a cache space when obtaining a contact person communication log view information sent by the user, and one by one read all categorized communication logs corresponding to the phonebook contact person stored in the EF_EXT1 file of the subscriber identity module/user identity model, and store them in the cache space, thereafter display all the categorized communication logs corresponding to the phonebook contact person in a form of a list. In practical applications, it is configured to read the communication logs of the contact person in the subscriber identity module/user identity model according to their categories, and divide them into three log tabs: call logs, short message logs and email logs, and display the read-out communication logs in the form of a list through their categories.

And, the device for storing a communication log in a subscriber identity module/user identity model further comprises:

synchronization information module 603, configured to, when the user updates information of a phonebook contact person in the subscriber identity module/user identity model, search, based on the ID of the updated field, for communication logs associated with the ID of the field in the EF_EXT1 file of the subscriber identity module/user identity model in the basis, when searched out, modify contents in the last byte of the previous communication log to the contents in the last byte of the current communication log, and if the current communication log is the first communications log stored in the EF_EXT1 file of the subscriber identity module/user identity model, modify contents in the last byte of this communication log in the abbreviated dialing number log (ADN) file to the contents logged in the last byte of this communication log. In practical applications, it is configured to synchronously update the communication logs associated with the field if the user edits the number and email information of the contact person in the subscriber identity module/user identity model.

Continue to refer to FIG. 6, the embodiment of the present document further provides a terminal, comprising a device for storing a communication log in a subscriber identity module/user identity model, wherein, the device comprises:

data preprocessing module 601, configured to, after communicating with a phonebook contact person in the subscriber identity module/user identity model, format time and duration information of the current communication based on a preset communication log format, and obtain and store a byte stream of the current communication log;

write-in processing module 602, configured to write the formatted byte stream of the current communication log in the EF_EXT1 file of the subscriber identity module/user identity model and categorize the current communication log according to the preset communication type identifier.

Wherein, the write-in processing module 602 is further configured to write the formatted byte stream of the current communication log into the EF_EXT1 file of the subscriber identity module/user identity model and perform an index for connection through the last byte of each communication log.

Wherein, the device for storing a communication log in a subscriber identity module/user identity model further comprises:

displaying module 604, configured to apply for a cache space when obtaining a contact person communication log view information sent by the user, and one by one read all categorized communication logs corresponding to the phonebook contact person stored in the EF_EXT1 file of the subscriber identity module/user identity model, and store them in the cache space, thereafter display all the categorized communication logs corresponding to the phonebook contact person in the form of a list.

Wherein, the device for storing a communication log in a subscriber identity module/user identity model further comprises:

synchronization information module 603, configured to, when a user updates information of a phonebook contact person in the subscriber identity module/user identity model, based on the ID of the updated field, search for communication logs associated with the ID of the field in the EF_EXT1 file of the subscriber identity module/user identity model, when searched out, modify contents stored in the last byte of the previous communication log to the ID value of the current communication log in the EF_EXT1 file, if the current communication log is the first communication log stored in the EF_EXT1 file of the subscriber identity module/user identity model, modify contents in the last byte of this communication log in the abbreviated dialing number log (ADN) file to the ID value of this communication log in the EF_EXT1 file.

In the following, the GSM mobile phone is taken for example to illustrate the implementation steps of the embodiment of the present document.

As shown in FIG. 1, it is a flow chart of the function of storing communication logs of a contact person in the subscriber identity module/user identity model in accordance with an embodiment of the present document, and the steps of the function implementation process in accordance with the embodiment of the present document mainly comprise the following processing.

Step 101, after a communication log is generated, according to the type of the communication log, a byte stream of communication log is generated in accordance with the data format agreed in the present method.

Step 102, the last byte of the log in the EF_AND file is used to index communication logs of the contact person, if this byte is FF, it indicates that the contact person does not have communication logs, and then an empty log in the EF_EXT1 file is searched out and written with the communications log, and the second bit of the first byte is set to 1, then the last byte is set to FF. If the byte is not FF, indicating that the there is already communication logs of the contact person, the value of the byte is read out, and this value is the corresponding ID value in the EF_EXT1 file, then the log of the ID in the EF_EXT1 file is read out and the last byte is obtained, if this byte is FF, then an empty log in the EF_EXT1 file is searched out and written with the communication log, and the ID of this log is written into the last byte of the previous communication log. If the byte is not FF, then the value of the last byte is read out, and this value is the ID value of the next communication log in the EF_EXT1 file, until the log whose last byte is FF in the communication logs is searched out, then this communication log is written into the empty log in the EF_EXT1 file, and the last byte of the last communication log is written with the ID where the current log is located.

Step 103, when the user views the communication logs of the contact person, the communication logs are loaded in different categories, firstly a content space is applied, and all of the communication logs of the contact person are read one by one in the EF_EXT1 file, and then the communication log data are categorized and stored into the applied cache according to the type of the communication log, and the data in the cache at this time are categorized and stored into the list contents to provide them for the user to view in the form of a list.

Step 104, the information of the contact person in the subscriber identity module/user identity model updated by the user is received.

Step 105, when the user updates the contact person information in the subscriber identity module/user identity model, the ID of the updated field is recorded, and it searches for whether there is a communication log associated with this field in the EF_EXT1 file or not via the field ID.

Step 105, if there is a communication log associated with this field, firstly contents in the last byte of the previous communication log is modified to the contents in the last byte of the current communication log, and if the current communication log is the first one, then the contents in the last byte of this communication log in the ADN file is modified to the contents recorded in the last byte of this communication log.

Figure 2:
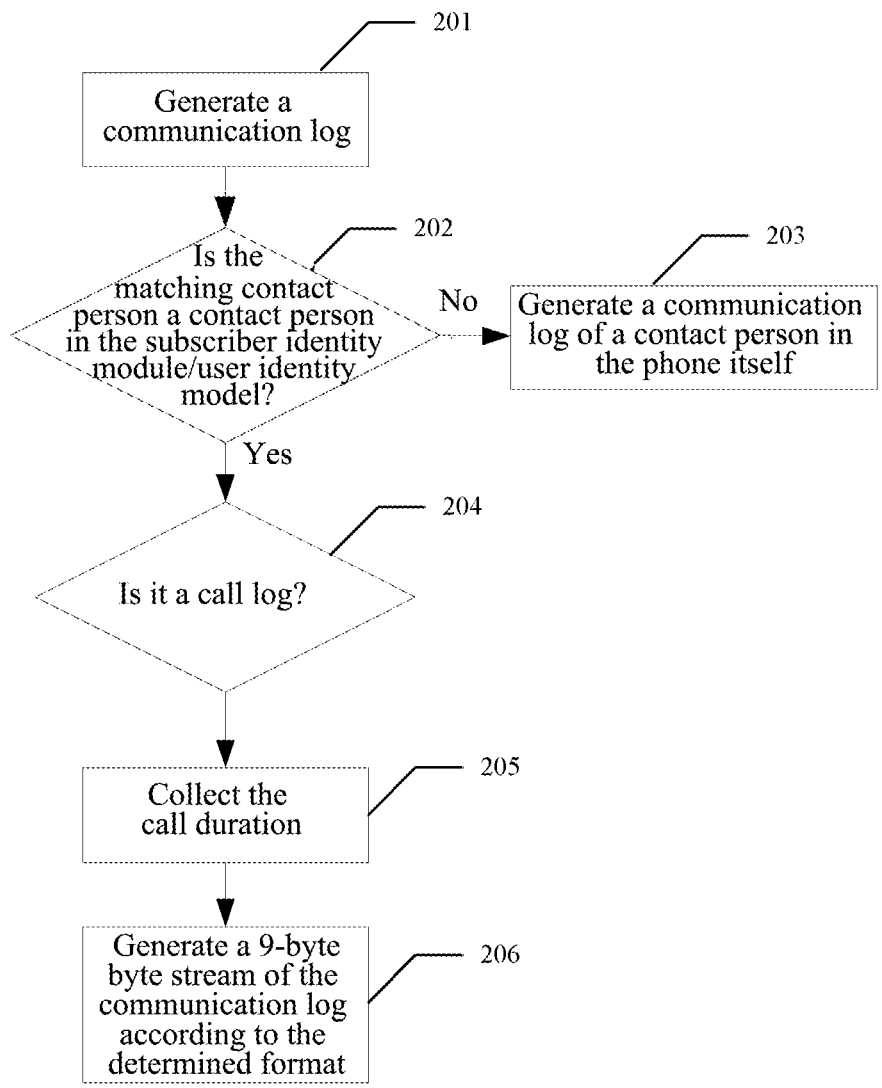
FIG. 2 is a schematic diagram of the process of formatting communication log data provided in an embodiment of the present document.

As shown in FIG. 2, it is a process of formatting communication log data according to an embodiment of the present document, comprising the following steps.

Step 201, a notification is sent out via a call, a short message or an email, and the notification generates a communication log.

Step 202, a contact person matching operation is performed for the number or Email of the communication log, if the match is successful, information about whether the current contact person is a contact person in the subscriber identity module/user identity model or not is returned.

Step 203, if the contact person is not a contact person in the subscriber identity module/user identity model, indicating that the contact person is a contact person in the phone itself, a communication log of the contact person in the phone itself is directly generated, which is not within the concerning scope of the present method.

Step 204, judge whether the current log is a call log or not.

Step 205, if it is a call log, the call duration is obtained.

Step 206, after the user communicates (via a call, short message, email) with the contact person in the subscriber identity module/user identity model, the field ID of the communication log is generated from time and duration (the duration of short message and Email is denoted as 0) of the current communication and stored with a 9-bytes cache.

Figure 3:
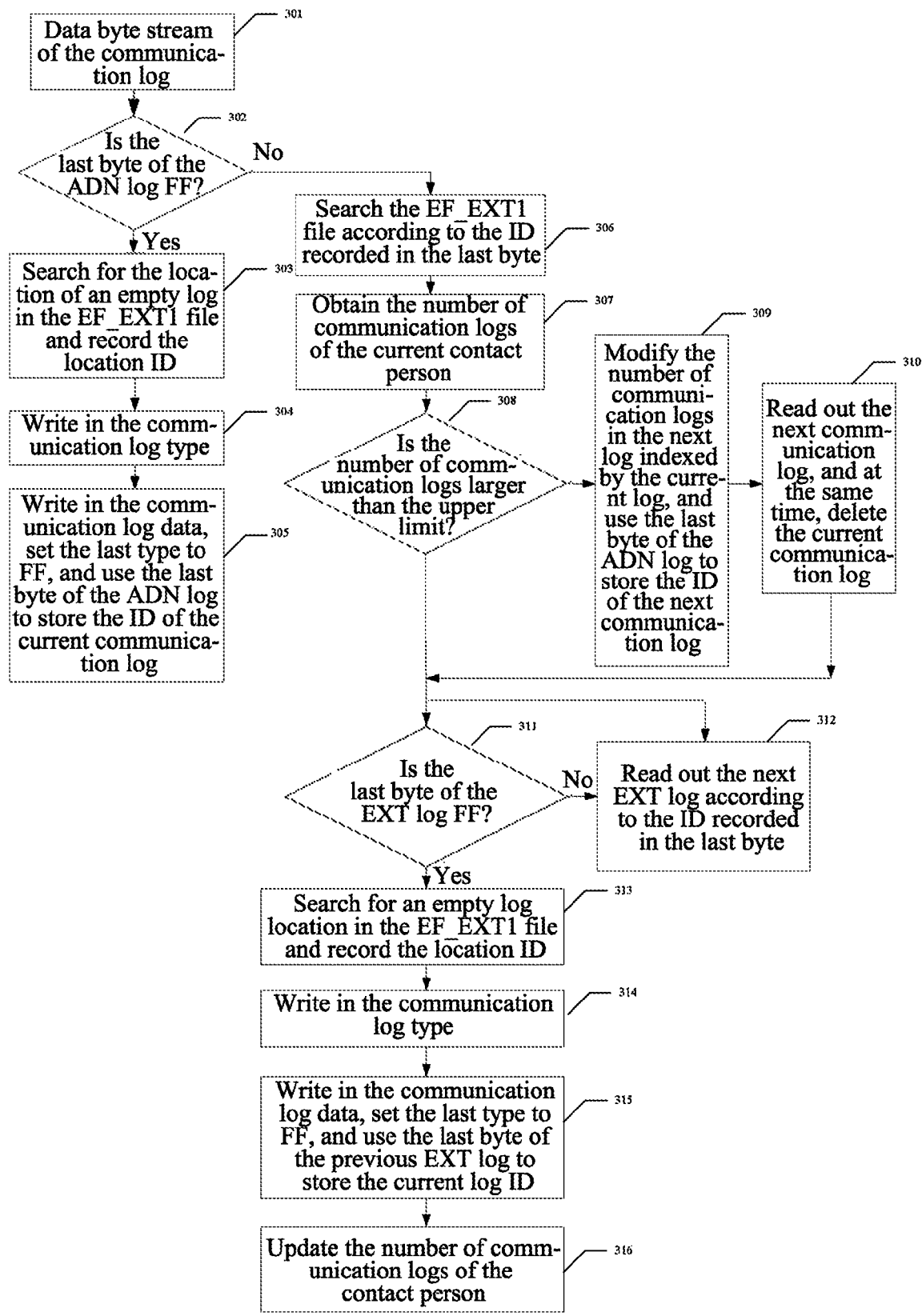
FIG. 3 is a schematic diagram of the process of storing communication logs of contact persons in the subscriber identity module/user identity model provided in an embodiment of the present document.

As shown in FIG. 3, it is the process of storing communications logs of a contact person in the subscriber identity module/user identity model in accordance with an embodiment of the present document, comprising the following steps.

Step 301, obtain a byte stream of communication log generated in step 206.

Step 302, judge whether the last byte of the current ADN log is FF or not.

Step 303, if it is FF, indicating that the current contact person does not have communication logs yet, directly search for an empty location in the EF_EXT1 file and record the ID of the current position.

Step 304, write the byte stream of the communication log, comprising updating the number of communication logs to set to 1, into the location searched out in step 303.

Step 305, the communication log data are written in, the last byte is set to FF, and the last byte of the ADN log is stored with the ID of the current communication log.

Step 306, if the last byte of the ADN log is not FF, indicating that there is already communication log for the contact person, at this time, the communication log at the corresponding location in the EF_EXT1 file is searched out according to the log ID stored in this byte.

Step 307, the number of communication logs stored in the first communication log is obtained.

Step 308, judge whether the number of communication logs is greater than the agreed upper limit or not.

Step 309, if the number of communication logs is greater than the agreed upper limit, then the number of communication logs in the next log indexed by the current log is modified and set to "1111", the ID of the next communication log is stored into the last byte of the ADN log, and then proceed to step 310 to execute.

Step 310, the next communication log ID to which the last byte of the current communication log points is read out, and the current communication log is deleted when the reading is completed, and a new communication log is ready to be inserted.

Step 311, judge whether the last byte of the current communication log is FF or not.

Step 312, if it is not FF, indicating that the current log is not the last log of the contact person, then continue reading the next communication log, and return to step 311 to execute, until the last communication log is searched out.

Step 313, if it is FF, indicating that the current communication log is the last log, then the ID value of this log is recorded, and then a position where an empty log is in the EF_EXT1 file is searched out.

Step 314, the communication log data are written into the empty location in the EF_EXT1 file, and the last byte is set to FF, indicating that it is the last communication log.

Step 315, after the communication log is stored, the ID of this log is written into the last byte of the communication log obtained in step 313, and the connection to communication logs is complete.

Step 316, the number of communication logs in the first communication log obtained in step 306 is updated.

Figure 4:
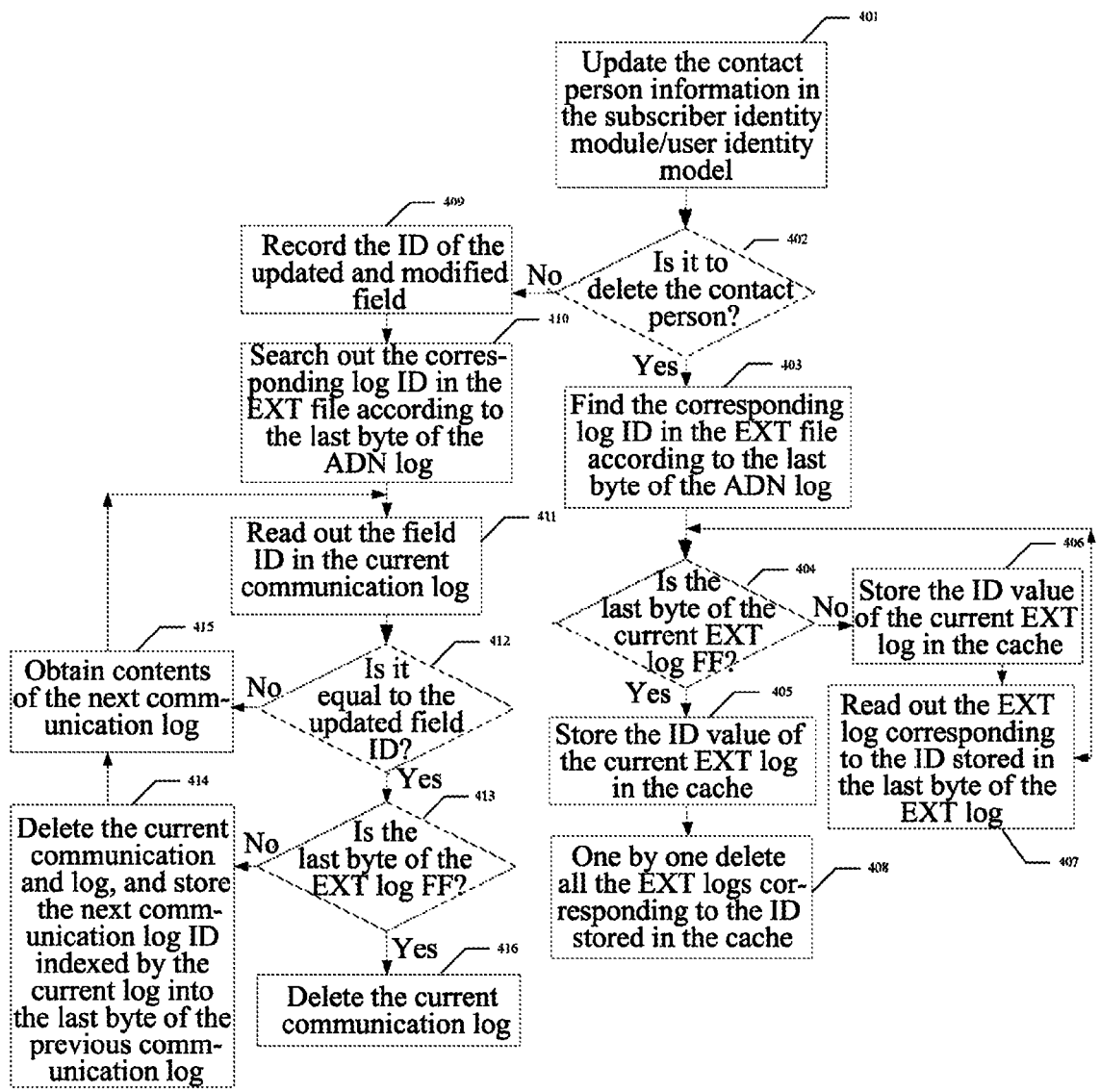
FIG. 4 is a schematic diagram of the process of simultaneously updating communication logs of a contact person in a subscriber identity module/user identity model provided in an embodiment of the present document.

As shown in FIG. 4, it is a process of synchronously updating communication logs of a contact person in the subscriber identity module/user identity model in accordance with an embodiment of the present document, comprising the following steps.

Step 401, the user updates the contact person information in the subscriber identity module/user identity model.

Step 402, judge whether the current operation is to delete the contact person or not.

Step 403, if it is to delete the contact person, then the corresponding communication log ID in the EXT file is searched out according to the last byte of the ADN log.

Step 404, judge whether the last byte of the current EXT log is FF or not.

Step 405, if it is FF, indicating that the communication logs of the contact person are searched completely, and what stored in the cache are already all the communications logs of the contact person.

Step 406, if it is not FF, the ID of the current log is added into the cache.

Step 407, the next log is read out in accordance with the ID of the next log stored in the last byte of the current log, return to step 404 to judge, until the IDs of all the communication logs are added completely.

Step 408, the communication logs whose IDs are recorded in the cache are deleted one by one.

Step 409, if the current operation is not to delete the contact person, then it is surely to edit the contact person information, and at this time, the field ID of the contact person information to be edited is logged.

Step 410, the corresponding log ID in the EXT file is searched out according to the last byte of the ADN log.

Step 411, the contact person information field ID stored in the data portion of the current communication log is read out.

Step 412, judge whether the field ID stored in step 408 and the field ID obtained in step 410 are equal or not.

Step 413, whether the last byte of the current EXT log is FF or not is determined.

Step 414, if the determination result in step 414 is false, indicating that the current communication log is not the last communication log of the contact person, then the current communication log is deleted, and the ID of the next communication log indexed by the current log is stored into the last byte of the previous communication log.

Step 415, the next communication log is read out, and then return to step 411 to execute.

Step 416, if the determination result in step 414 finds out that the value of the last byte of the current communication log is FF, indicating that the current communication log is the last communication log, then just directly delete it.

Figure 5:
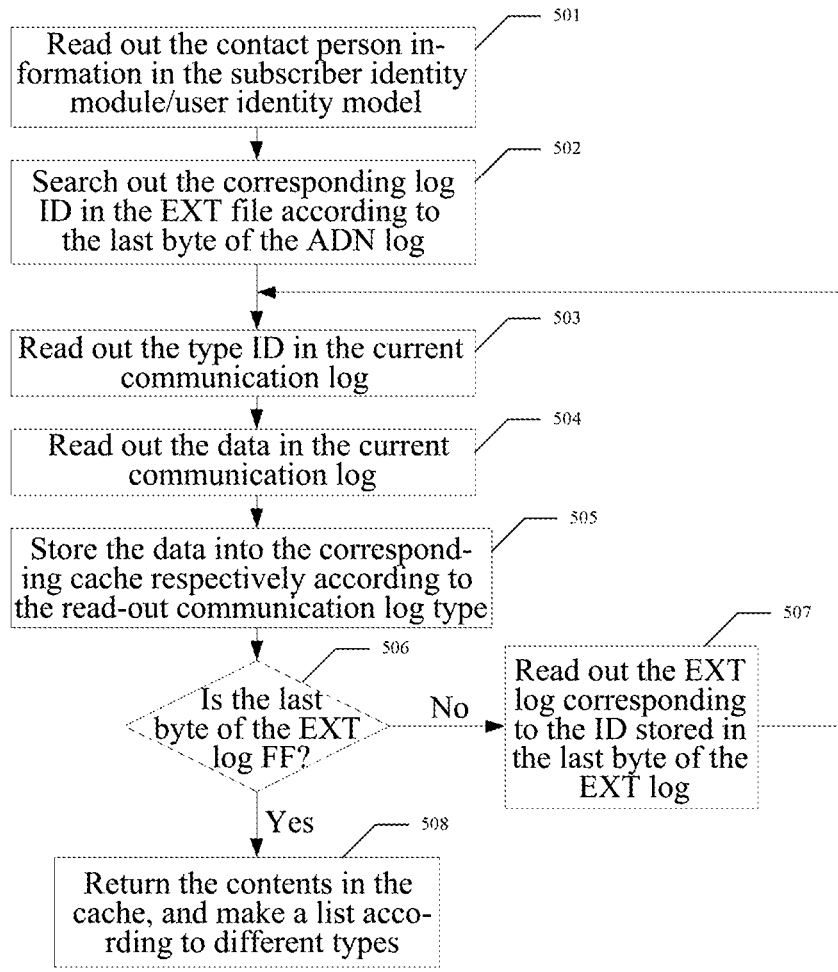
FIG. 5 is a schematic diagram of the process of reading communication logs of a contact in a subscriber identity module/user identity model provided in an embodiment of the present document.

As shown in FIG. 5, it is the process of reading communication logs of a contact person in the subscriber identity module/user identity model in accordance with an embodiment of the present document, comprising the following steps.

Step 501, the user reads the contact person information in the subscriber identity module/user identity model.

Step 502, the corresponding log ID in the EXT file is searched out according to the last byte of the ADN log of the current contact person.

Step 503, the type ID in the current communication log is read out according to the corresponding log ID in the EXT file.

Step 504, data in the current communication log, that is, contents stored in the $2^{nd}$-$12^{th}$ bytes are read out.

Step 505, the data are respectively stored in the corresponding cache in accordance with the type of readout communication logs.

Step 506, judge whether the last byte of the current EXT log is FF or not.

Step 507, if it is not FF, read out the EXT log corresponding to the ID stored in the last byte of the EXT log, and then return to step 503 to execute.

Step 508 the contents in the cache are returned and lists are made according to different types.

In summary, in the embodiment of the present document, by extending the EXT file in the subscriber identity module/user identity model and using the reserved 6 bits of the first byte in the EXT file log, the types and number of communication logs are increased, and the contents of the communication logs are written into the EF_EXT file log, thereby enabling the technical solution of storing communications logs of a contact person in the subscriber identity module/user identity model, and through the method for storing a communication log of a contact person in the subscriber identity module/user identity model, the versatility of communication log function in different mobile terminals is achieved, and the user experience is improved.

The above description is only preferred embodiments of the present document and is not intended to limit the patent claims of the embodiment of the present document, and all the equivalent structures or equivalent process transformations made using the specification and the accompanying drawings in accordance with the embodiments the present document, directly or indirectly used in other related technical fields, are similarly included in the patent protection scope of the embodiment of the present document.

INDUSTRIAL APPLICABILITY

After the embodiment of the present document is used to store communications logs of a contact person in the subscriber identity module/user identity model, its communication logs stored in the subscriber identity module/user identity model can be universally used in different mobile phone terminals, thereby increasing the versatility of the communication log function and greatly improving the user experience.

The embodiment of the present document can be used to improve the robustness of communication log data storage, regardless whether the user replaces a phone terminal, restores the factory settings or clears user data or not, as long as the user does not replace the subscriber identity module/ user identity model, communication logs, such as when called, texted or emailed, with a certain contact person can always be viewed.

What is claimed is:

1. A method for storing a communication log in a subscriber identity module/user identity model, comprising:

after communicating with a phonebook contact person in the subscriber identity module/user identity model, formatting time and duration information of a current communication according to a preset communication log format, and obtaining and caching a byte stream of a current communication log;

writing the cached byte stream of the current communication log into an EF_EXT1 file of the subscriber identity module/user identity model, and using a communication type identifier corresponding to the current communication to categorize the current communication log;

wherein, after the step of writing the cached byte stream of the current communication log into the EF_EXT1 file of the subscriber identity module/user identity model, the method further comprises: using a last byte of the current communication log to index a next communication log of the phonebook contact person, if the current communication log is a first communication log of the phonebook contact person, using a last byte of a communication log in an abbreviated dialing number log (ADN) file to index the current communication log of the phonebook contact person to make the indexes of communication logs of the phonebook contact person in series.

2. The method for storing a communication log in a subscriber identity module/user identity model of claim 1, further comprising:

when obtaining a contact person communication log view information sent by a user, applying for a cache space, and one by one reading all categorized communication logs corresponding to the phonebook contact person stored in the EF_EXT1 file of the subscriber identity module/user identity model, and storing them in the cache space, thereafter displaying all the categorized communication logs corresponding to the phonebook contact person in a form of a list.

3. The method for storing a communication log in a subscriber identity module/user identity model of claim 1, further comprising:

when a user updates information of a phonebook contact person in the subscriber identity module/user identity model, searching, based on an ID of an updated field, for communication logs associated with the ID of the field in the EF_EXT1 file of the subscriber identity module/user identity model, and when searched out, modifying contents stored in the last byte of the previous communication log to a ID value of the current communication log in the EF_EXT1 file, if the current communication log is a first communication log stored in the EF_EXT1 file of the subscriber identity module/user identity model, modifying contents of a last byte of the current communication log in the ADN file to the ID value of the current communication log in the EF_EXT1 file.

4. A device for storing a communication log in a subscriber identity module/user identity model, comprising:

a data preprocessing module, configured to, after communicating with a phonebook contact person in the subscriber identity module/user identity model, format time and duration information of a current communication based on a preset communication log format, obtain and cache a byte stream of the current communication log;

a write-in processing module, configured to write the cached byte stream of the current communication log into an EF_EXT1 file of the subscriber identity module/user identity model, and use a communication type identifier corresponding to the current communication to categorize the current communication log;

wherein, the write-in processing module is further configured to, after writing the cached byte stream of the current communication log into the EF_EXT1 file of the subscriber identity module/user identity model, use a last byte of the current communication log to index a next communication log of the phonebook contact person, if the current communication log is a first communication log of the phonebook contact person, use a last byte of a communication log in an abbreviated dialing number log (ADN) file to index the current communication log of the phonebook contact person to make the indexes of communication logs of the phonebook contact person in series.

5. The device for storing a communication log in a subscriber identity module/user identity model of claim 4, further comprising:

a displaying module, configured to apply for a cache space when obtaining a contact person communication log view information sent by the user, and one by one read all categorized communication logs corresponding to the phonebook contact person stored in the EF_EXT1 file of the subscriber identity module/user identity model, and store them in the cache space, thereafter display all the categorized communication logs corresponding to the phonebook contact person in a form of a list.

6. The device for storing a communication log in a subscriber identity module/user identity model of claim 4, further comprising:

a synchronization information module, configured to, when a user updates information of a phonebook contact person in the subscriber identity module/user identity model, search, based on an ID of a updated field, for communication logs associated with the ID of the field in the EF_EXT1 file of the subscriber identity module/user identity model, when search out, modify contents stored in a last byte of a previous communication log to the ID value of the current communication log in the EF_EXT1 file, if the current communication log is a first communications log stored in the EF_EXT1 file of the subscriber identity module/user identity model, modify contents of the last byte of the current communication log in the ADN file to the ID value of the current communication log in the EF_EXT1 file.

7. A terminal, comprising a device for storing a communication log in a subscriber identity module/user identity model, wherein, the device comprises:

a data preprocessing module, configured to, after communicating with a phonebook contact person in the subscriber identity module/user identity model, format time and duration information of the current communication based on a preset communication log format, obtain and cache a byte stream of the current communication log;

a write-in processing module, configured to write the cached byte stream of the current communication log into an EF_EXT1 file of the subscriber identity module/user identity model, and use a communication type identifier corresponding to the current communication to categorize the current communication log;

wherein, the write-in processing module is further configured to, after writing the cached byte stream of the current communication log into the EF_EXT1 file of the subscriber identity module/user identity model, use a last byte of the current communication log to index a next communication log of the phonebook contact person, if the current communication log is a first communication log of the phonebook contact person, use a last byte of a communication log in an abbreviated dialing number log (ADN) file to index the current communication log of the phonebook contact person to make the indexes of communication logs of the phonebook contact person in series.

8. The terminal of claim 7, wherein, the device for storing a communication log in a subscriber identity module/user identity model further comprises:

a displaying module, configured to apply for a cache space when obtaining a contact person communication log view information sent by a user, and one by one read all categorized communication logs corresponding to the phonebook contact person stored in the EF_EXT1 file of the subscriber identity module/user identity model, and store them in the cache space, thereafter display all the categorized communication logs corresponding to the phonebook contact person in a form of a list.

9. The terminal of claim 7, wherein, the device for storing a communication log in a subscriber identity module/user identity model further comprises:

a synchronization information module, configured to, when a user updates information of a phonebook contact person in a subscriber identity module/user identity model, based on an ID of a updated field, search for communication logs associated with the ID of the updated field in the EF_EXT1 file of the subscriber identity module/user identity model, when searched out, modify contents stored in the last byte of the previous communication log to the ID value of the current communication log in the EF_EXT1 file, if the current communication log is the first communications log stored in the EF_EXT1 file of the subscriber identity module/user identity model, modify contents of the last byte of the current communication log in the ADN file to the ID value of the current communication log in the EF_EXT1 file.

* * * * *